United States Patent [19]

Hirsig

[11] 3,980,158
[45] Sept. 14, 1976

[54] BRAKE APPARATUS WITH VARIABLE BRAKE FORCE FOR AERIAL CABLEWAYS

[75] Inventor: Emil Hirsig, Thun, Switzerland

[73] Assignee: Willy Habegger, Thun, Switzerland

[22] Filed: Nov. 11, 1974

[21] Appl. No.: 522,586

[30] Foreign Application Priority Data

Nov. 21, 1973 Switzerland.................... 16372/73
July 27, 1974 Germany........................ 2436253

[52] U.S. Cl............................... 188/42; 105/148; 188/44; 188/170
[51] Int. Cl.²........................................... B61H 9/02
[58] Field of Search ............... 188/65.1, 85, 42, 43, 188/44, 170, 188, ; 104/89; 105/148, 150

[56] References Cited

UNITED STATES PATENTS

| | | |
|---|---|---|
| 3,369,501 | 2/1968 | Tsuchimochi....................... 188/42 |
| 3,856,118 | 12/1974 | Feuz .................................. 188/170 |

FOREIGN PATENTS OR APPLICATIONS

| | | | |
|---|---|---|---|
| 197,862 | 11/1957 | Austria ................ | 188/42 |
| 218,064 | 12/1959 | Austria ................ | 188/42 |
| 2,135,043 | 3/1972 | Germany ............. | 188/43 |
| 323,222 | 7/1957 | Switzerland.......... | 188/43 |
| 292,279 | 7/1953 | Switzerland.......... | 188/43 |

*Primary Examiner*—Stephen G. Kunin
*Assistant Examiner*—Edward R. Kazenske

[57] ABSTRACT

A brake apparatus with variable braking force for cable cars having a brake mount or housing connectable with a cable car by a connection shaft and including at least one pressure released catch brake. The catch brake has brake jaws which can be applied with a predetermined brake pressure to a guide track of the cable car, and a brake release for releasing the brake jaws in counter action to the brake pressure. Also provided is a first brake release pressure generator connected with the brake release, an actuable brake applying device connected with the brake release; at least one brake force measuring device coupling the brake mount with the connection shaft for ascending travel of the cable car and at least one other brake force measuring device coupling the brake mount with the connection shaft for descending travel. Finally, a control system controlled by the brake force measuring devices via a brake force balance, with the control system including a second brake release pressure generator controlled by the brake force measuring devices and operatively connected with the brake release in place of the first brake release pressure generator when the applying device is actuated.

11 Claims, 7 Drawing Figures

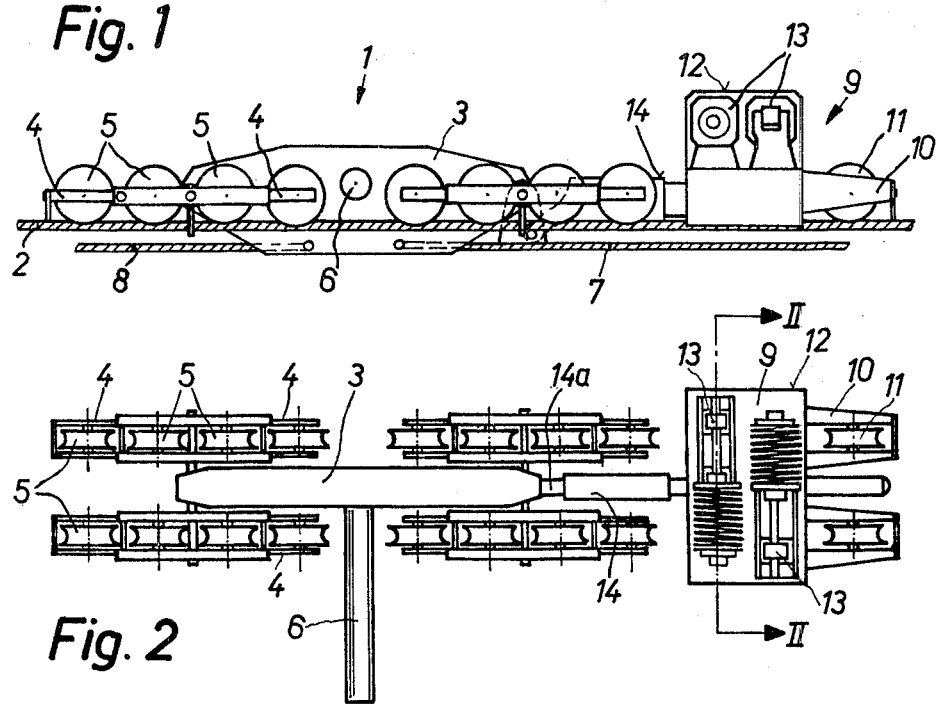
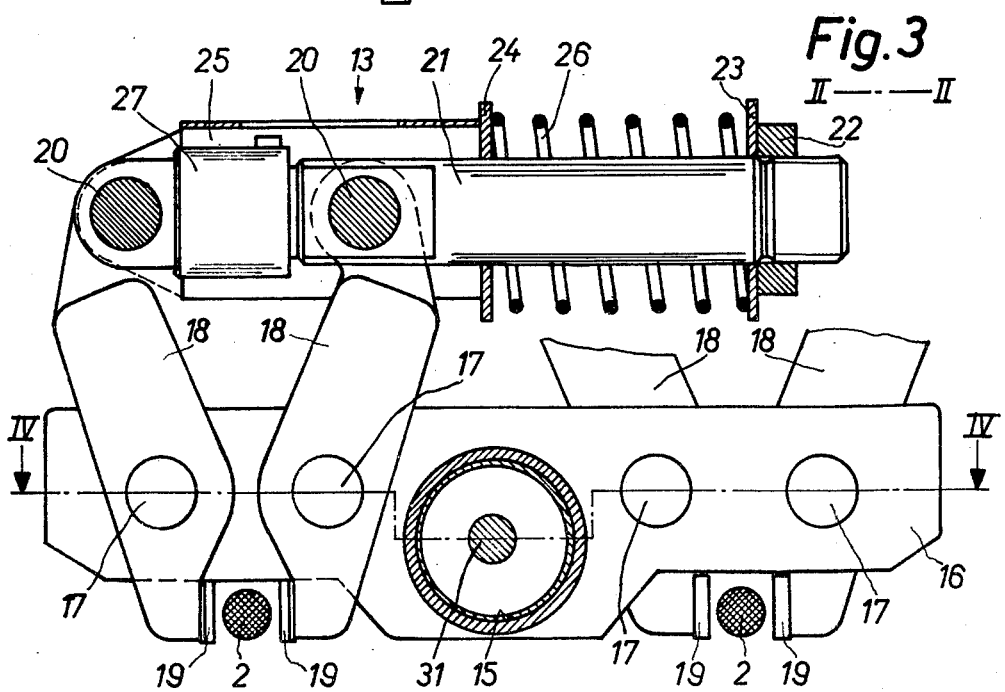

IV--IV

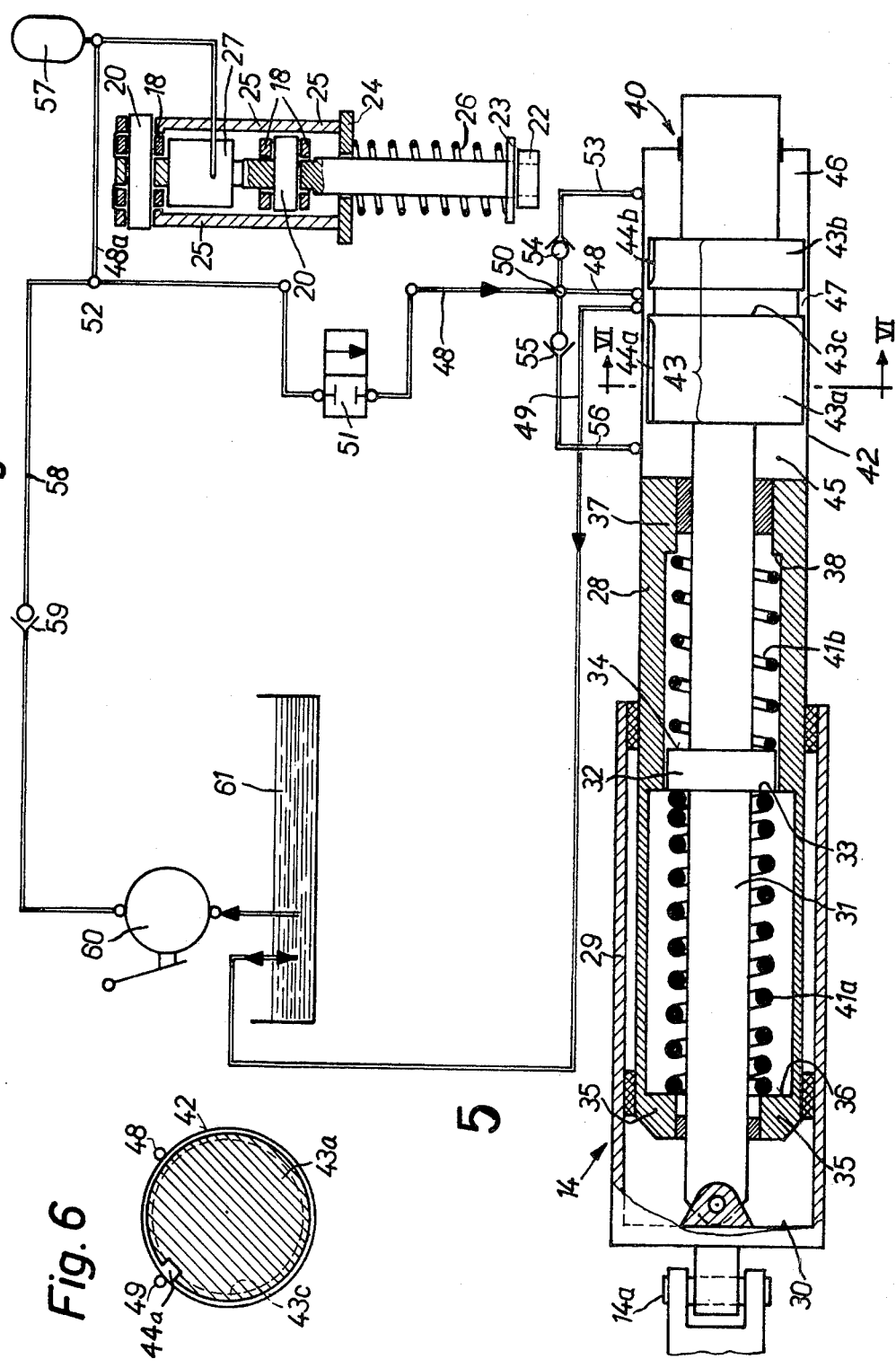
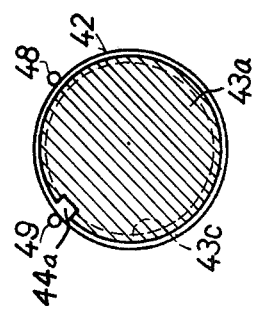
Fig. 5
Fig. 6

BRAKE APPARATUS WITH VARIABLE BRAKE FORCE FOR AERIAL CABLEWAYS

BACKGROUND OF THE INVENTION

The present invention relates to a new and improved construction of brake apparatus with variable braking force for cablecars, i.e. cable railway vehicles or aerial cableway vehicles, of the type incorporating at least one pressure-released catch brake and wherein the actual brake or brakes are arranged in a separate brake mount or housing coupled with the traveling carriage of the cable railway or aerial cableway, and furthermore, means are provided in order, following application of the brake, to automatically reduce the brake pressure with increasing coefficient of friction and to increase the brake pressure with decreasing coefficient of friction.

In the construction of brake devices for cablecars, especially aerial cableways, generally for determining the required braking force the coefficient of friction $\mu$ is considered as a constant value. According to the regulations of the authorities there must be calculated a coefficient of friction of $\mu = 0.1$ and the checking and approval of braking devices at aerial cableways is based upon these considerations. In fact, however, the coefficient of friction $\mu$ is not constant, but fluctuates essentially between 0.05 to 0.3, depending upon the surface properties of the brake elements and the stationary components of the cableway at which the braking effort occurs, in other words in the case of an aerial cableway the support cable or in the case of a funicular or cable railway the rails. It is practically not possible for the stationary cableway component to obtain throughout the entire cableway or track length over a longer operating time a coefficient of friction which is within a very narrow variable range. Also in the case of completely closed support cables there are always present smooth and rough locations. These conditions are naturally taken into account during the determination of the constant calculated value for the coefficients of friction. This leads however to the fact that in most instances the braking force is too large, i.e. the braking effort is much too pronounced. After carrying out the braking effort it then happens that there is a fraying or eroding of the brake jaws during the braking action and later melting away of the brake jaw material. A too pronounced braking action in the case of an aerial cableway represents a danger of overloading the vehicle due to centrifugal acceleration, overloading the traction cable and carrier or support cable, the supports and so forth, i.e. in other words the installation and the passengers are placed in danger. This is also the case for funiculars. In the case where the braking effort is too weak then there is the danger that the cabin will slide.

The dangers existing when the braking effort is too pronounced have been already recognized and previously it has been considered to be desirable to be able to vary the braking force of the braking devices at aerial cableways. Thus, in Swiss Pat. No. 209,254 for instance, there is the suggestion that the magnitude of the braking force or effort can be influenced by the deceleration occurring during braking of the cabin. However, no technical realization of this possibility has really been disclosed in this patent. In the more recent Swiss Pat. No. 292,279 there is described a braking mechanism with variable braking force at aerial cableway vehicles wherein between the traveling mechanism or carriage possessing the conventional clamp brakes and the load container of the vehicle there is interposed a transmission in such a manner that the load container automatically influences the braking force of the clamp brake, and the load container is hingedly connected with the traveling mechanism for a relative displacement in the direction of travel, and the displacement occurring during braking, against the pressure of a spring, brings about by means of the transmission a corresponding closing movement of the clamp brake directly or through the agency of an oppositely directed wedge. In the even more recent Swiss Pat. No. 323,222, there is described a further brake mechanism with variable braking force, in which a separate brake shoe support which is displaceable relative to the aerial cableway in the direction of travel, during the braking action, is automatically pulled by the action of a spring against a wedge closing the clamp. However, practical significance has not been attained by such braking devices with variable braking force. Just as was heretofore the case the construction of braking devices at aerial cableways, as previously mentioned, is predicted upon an assumed constant coefficient of friction. This conception has particularly found usefulness in the case of light aerial cableway vehicles and in such instance is justified. In the meantime, however, the capacity of the cabins of the more recently constructed aerial cableways and therefore the weight of the vehicle has considerably increased, so that the tendency prevails to build even larger aerial cableways with cabins capable of accommodating over 100 individuals. Under these circumstances a brake device possessing a braking force which varies during the braking action corresponding to variable coefficients of friction again becomes actual, since only such braking devices can ensure for a faultless and especially pendulum-free catch brake action and guarantee for the safety of the passengers. The previously mentioned known braking devices of this type, however, are much too inaccurate and too sluggish or inertia-prone in their action, in order to deliver for such type heavy aerial cableway vehicleseven a somewhat reliable braking effort. Just how high are to be placed the requirements regarding safety for a brake mechanism with variable brake force is determined for instance by the fact that a control of the brake force as a function of deceleration- or acceleration values measured by means of an acceleration measuring device, for instance a tachodynamo, driven by a traveling roller, must be considered as cumbersome and impractical since there cannot be eliminated the situation that the traveling roller driving the tachodynamo briefly slides at the support or carrier cable or is raised from the aforementioned carrier cable and just during this time initiates a catch braking action.

SUMMARY OF THE INVENTION

Hence, it is a primary object of the present invention to provide an improved construction of brake mechanism with variable braking force for aerial cableways by means of which it is possible to exactly and reliably brake even the heaviest vehicles, and which is capable of reacting sufficiently rapidly even for quick changes in the coefficient of friction during the braking action and which when necessary also can be amplified for the braking of an ascending or mountain-side traveling vehicle, and specifically such that no modifications are necessary during changing the direction of travel.

Now in order to implement these objects as well as others which will become more readily apparent as the description proceeds, the inventive apparatus is manifested by the features that the brake housing carrying the catch brake(s) is coupled with the traveling mechanism for the ascending and descending travel by means of at least one respective force measuring device and the brake air pressure is controlled via a brake force balance from the brake force measuring devices. Due to the brake force measurement with force measuring devices it is possible to use the known reliable measurement value transmitters which are also accurate for pronounced forces, such as strain gauges, electrical or hydraulic force measuring cells or also, and indeed avantageously, measuring springs. Furthermore, even with the heaviest aerial cableways during the braking action the displacement of the braking housing relative to the traveling mechanism or carriage is only very slight and owing to the control of the braking air pressure via a brake force balance directly by the brake force measuring devices there is obtained a rapid, exact and in every operational condition of the vehicle reliable reaction of the catch brakes, so that the operational reliability is ensured for in any event. As the catch brakes there can be used the conventional spring-loaded clamp brakes which can be vented by hydraulic brake air cylinder means and the brake air cylinders of the clamp brakes can be connected with a control hydraulic mechanism with a control device controlled by the force measuring devices, wherein the control hydraulic mechanism contains a brake release mechanism and wherein, when the brake release mechanism is not actuated, there is present in the brake air cylinder the entire air pressure, and when the brake release mechanism is triggered or released the brake air cylinder is connected to the control mechanism.

As a further construction of the inventive equipment the control mechanism can possess an idling range which corresponds to the force measuring range of the force measuring devices up to a predetermined rated braking force, and a respective control range for braking during downhill or descending travel and braking during uphill or ascending travel, wherein the idling range the brake air cylinders for the complete air pressure decrease and in the control range for a control of the air pressure can be switched by the brake force-measuring devices, so that upon release of a braking action at the clamp brake initially the entire braking pressure is effective and upon the presence or occurrence of higher braking force driving coefficient the force in the brake air cylinder is correspondingly increased very rapidly by the control mechanism which is then in its active control range and thus the brake effort or contact force is reduced, and specifically variably, depending upon whether the braking action should occur during downhill travel or uphill travel. The braking force balance can be of simple construction and can consist of a part which is nondisplaceable in the direction of travel and articulated by means of a connection shaft with the traveling mechanism and a brake carriage which is rigidly connected with the brake housing and relatively displaceable with respect to the articulated part in the direction of travel. Furthermore, at the articulated part as well as at the brake carriage there can be formed contact or bearing surfaces, by means of which the braking force can be transmitted to the brake force measuring devices arranged between such surfaces. In order to protect the sensitive parts of the brake force balance, in other words especially the force measuring devices, against external influences, advantageously the part articulated to the traveling mechanism can consist of a cylindrical housing and a transmission rod coaxially hinged to its floor having a cylindrical contact or bearing part forming two of the four contact surfaces and the brake carriage can be constructed as a cylindrical hollow body guided in the housing, which takes up the transmission rod and at its inside forms both of the other of the four contact surfaces. Advantageously, as mentioned, there are employed as the force measuring devices measuring springs, of which one is dimensioned for the determination of the braking force during the downhill or descending travel and the other for the detection or determination of the braking force during the uphill or ascending travel, and each measuring spring is appropriately arranged between a contact surface of the brake carriage and a contact surface of the transmission rod, wherein the control mechanism can be directly controlled by the displacement of the brake carriage relative to the transmission rod which occurs when the braking force is effective. In the control hydraulic the brake cylinder of each clamp brake of the brake housing can be connected to a brake fluid line containing the release mechanism, and which in the idling range of the control mechanism is connected with a return line leading to a brake fluid container and which in the control range of the control mechanism for the control of the braking force during the descending or valley travel and in the control range for the control of the braking force during the ascending or mountain travel is separated from the return line and instead is connected to a corresponding pressure transmitter of the control mechanism which is controlled by the brake force-measuring device for the downhill travel and by the brake force-measuring device for the uphill travel respectively. In order to prevent a complete venting of the brakes during the brake force control, it is possible to connect at each of the connection lines leading to the pressure transmitters a pressure accumulator. As the control device there can be employed a valve unit with controlled pressure transmitters. A control device of simple and robust construction which is suitable for the present purposes can consist of a control cylinder, the piston of which is sub-divided by a groove or rill or the like into a valley-side piston part or portion and a mountain-side piston part or portion and rigidly connected with the transmission rod. In the control cylinder there is provided at the side of the valley-side piston part a pressure compartment and at the side of the mountain-side piston part a further pressure compartment. In order that during a piston displacement into a pressure compartment there cannot prevail in the other pressure compartment any negative pressure which unfavorably influences the control, both piston parts advantageously possess a respective groove which axially leads almost up to the rill previously mentioned, by means of which in the control range of the control mechanism in each case the pressure compartment which is ineffectual for the control of the braking force during the downhill travel and the mountain travel respectively, is connected with the return flow conduit or line.

The inventive control apparatus composed of the control cylinder and control pistons with associated control hydraulic for the brake air cylinder and thus catch brakes renders possible an exact and reliable braking even during rapid changes in the coefficient of friction during the braking action. In fact the braking force can be regulated in control time intervals of 0.03 seconds and less. This means that there is always a well defined contact pressure of the catch brakes and their brake jaws at the support cable or cables, and even then when the braking force varies quite considerably in relatively rapid sequence.

For the case however that the braking force fluctuates with an extremely high frequency, the invention further proposes, and this proposal of course is of significance, that the control mechanism possess a braking force-control valve which is actuated by the transmission rod, and which in the idling range on the one hand connects the brake fluid conduit or line, leading from the brake fluid container while interpositing a pump to the brake air cylinders, with the return line leading back to the brake fluid container, on the other hand, connects a storage line branching off from the brake fluid line with an injection storage, and which in the control range — following the reversal brought about by the transmission rod — on the one hand separates the brake fluid line from the return line and connects such with the injection storage, on the other hand separates the storage lines from the injection storage. With this control apparatus there is achieved a control time interval of 0.005 seconds, so that there is ensured for an extremely rapid response when the braking force increases or drops in a jump-like or surge-like manner. In severe cases there is realized a regulation of the contact pressure by means of oil injection, wherein the injection storage at the same time constitutes a pressure transmitter. The braking force thus can be controlled in a surge-like manner by a preselected amount. With this exemplary embodiment the braking release mechanism is installed in the return flow line or conduit, whereas at the storage line there is further connected a filling storage. The storage connection is preferably provided between the braking force control valve and a check valve in the storage line or conduit.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic elevational view of a traveling carriage of a double-cable or bicable aerialway with thereat coupled brake carriage;

FIG. 2 illustrates the traveling mechanism or carriage with the brake carriage of FIG. 1 in plan view;

FIG. 3 is a cross-sectional view through the brake carriage taken along the line II—II of FIG. 2;

FIG. 5 schematically illustrates a braking force balance with control hydraulic mechanism containing measuring springs for the catch brakes;

FIG. 6 is a cross-sectional view of a control cylinder contained in the control hydraulic mechanism.

DETAILED DESCRIPTION OF THE PREFERRED EMBODIMENTS

Figure 4:
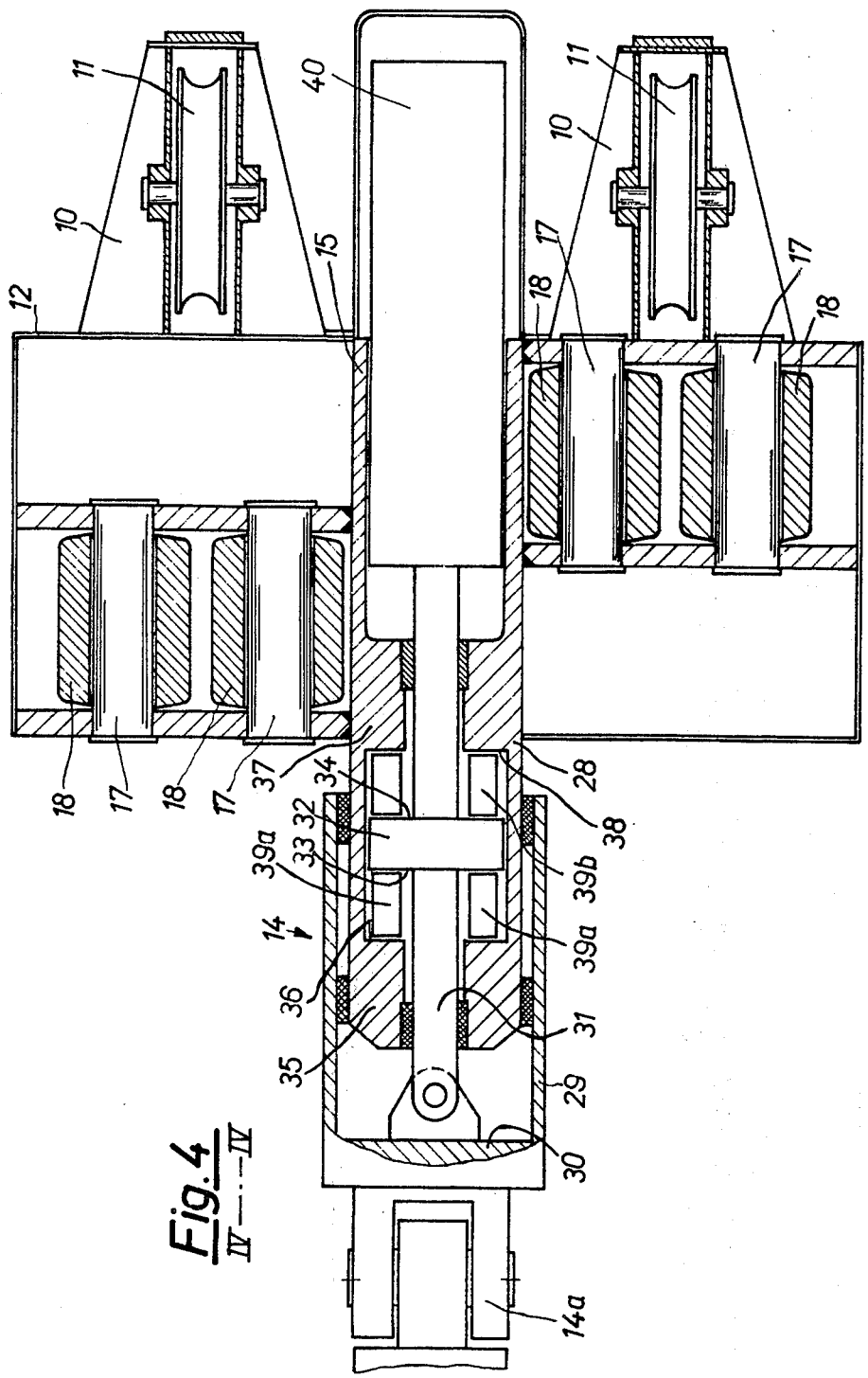
FIG. 4 is a cross-sectional view through the brake carriage taken along the line IV—IV of FIG. 3.

Describing now the drawings, the by way of example illustrated traveling carriage 1 of a double-cable or bicable aerialway shown schematically in elevational view in FIG. 1 and in plan view in FIG. 2 and equipped with two parallel stationary support or carrier cables 2 is essentially of conventional construction. The main carrier or support 3 of the traveling carriage carries at each side four double balances or rockers 4 with the traveling rollers 5 and the laterally protruding overhang arm 6 at which there is attached the pendulum arm together with the cabin which has not been particularly illustrated. Beneath the main carrier 3 there is secured at the uphill or mountain side the traction or tension cable 7 and at the valley or downhill side the counter cable 8. At the mountain or uphill side there is coupled at the main carrier or support 3 a brake carriage 9 by means of a brake carriage-connection shaft 14a, which is supported at the other end at both of the support or carrier cables 2 by rollers 11 mounted in supports 10. The brake mount or carriage 9 contains in its housing 12, in the illustrated embodiment, two catch brakes 13, one for each carrier cable 2, and is connected via a force balance 14 with the brake carriage-connection shaft 14a. The brake housing 12 can also contain for each carrier or support cable 2 a number of catch brakes 13 and can be coupled between the traveling rollers via the force balance 14 to the main carrier 3.

FIG. 3 illustrates a section through the brake carriage 9 along the line II—II of FIG. 2, wherein only the more essential components have here been illustrated. At a tubular-shaped lengthwise carrier or support 14 arranged between two support cables 2 there are attached the transverse carriers 16, which carry the legs 18 of both clamp-shaped catch brakes 13, and which legs are rotatable at the pins 17. Both of the catch brakes 13 are identical. The brake jaws 19 located at the lower leg ends, when spreading apart the upper leg ends, are pressed against the associated carrier or support cable 2. In the upper ends of the legs 18 there are mounted pivot pins 20. At the pivot pin 20 of the leg 18 which is closest to the lengthwise carrier or support 15 there is secured for rotation about the pin a guide rod 21 (FIG. 3), at the end of which there is threaded a threaded nut member 22. The nut member 22 serves as counter support for a spring plate 23 movable upon the guide rod 21. A second spring plate 24 movable upon the guide rod 21 is supported by means of the support arms 25 of the pivot pin 20 of the leg 18 situated furthest from the lengthwise carrier or support 15. At the guide rod 21 there is arranged between both of the spring plates 23 and 24 the tensioned brake spring 26, so that by means of such both of the legs 18 of the brake are spread via the guide rod 21 and the one spring plate 23 and respectively via the other spring plate 24 and the support arm 25 and the brake jaws 19 are pressed against the carrier or support cable. The brake spring 26 is dimensioned such that in each instance the maximum braking force or effort is obtained at the brake jaws 19. For releasing the brake 13 there is provided a brake releasing cylinder 27 which is arranged between the pivot pin 20 at the upper end of the leg 18. The brake is normally maintained in the released state, whereby the brake spring 26 is compressed. When the brake is released the brake cylinder 27 is continuously under pressure and by changing the pressure in the brake cylinder the brake force can be varied. During braking the pressure in the brake cylinder 27 is controlled via a hydraulic control mechanism through the agency of the brake force balance 14.

FIG. 4 illustrates a section through the brake carriage 9 along the line IV—IV of FIG. 3, in which there is schematically illustrated a brake force balance 14. Connected rigidly with the tubular-shaped lengthwise carrier or support 15, as already mentioned, are the transverse carriers or supports 16 which carry the legs 18 of the catch brakes 9 which are rotatable about the pins 17. At the mountain side of the brake carriage there is located the roller support 10 with the traveling rollers 11. At the valley or downhill side the lengthwise carrier or support 15 forms a brake carriage 28 which is displaceably mounted within a guide housing 29. This guide housing 29 is connected by the brake carriage-connection shaft 14a with the main carrier 3 of the running carriage in such a way that it cannot be displaced relative thereto in the direction of travel. The brake carriage 28 is coupled with the guide housing 29 by interposed force measuring devices. A possible embodiment of such coupling is schematically shown in FIG. 4. At the floor 30 of the guide housing 29 there is hingedly connected an axial transmission rod 31 which possesses a cylindrical bearing or abutment 32 with a valley-side and a mountain-side contact or bearing surface 33 and 34 respectively. In the brake carriage 28 there are formed for such bearings or supports two counter bearings or supports 35 and 37, one at the valley-side with a counter surface 36 confronting the valley-side contact side 33 and an uphill or mountain-side counter support with a counter surface confronting the mountain-side contact surface 34. Between both of the pairs, the valley-side contact surface 33 and the counter surface 36 as well as the mountain-side contact surface 34 and the counter surface 32 there are arranged one or more respective force measuring devices 39a and 39b respectively. During a braking action during traveling downhill, i.e. towards the valley, the valley-side force measuring devices 39a and during a braking during the mountain-side travel the mountain-side force measuring devices 39b are compressed or pressed together. Depending upon the requirements of the aerial cableway the force measuring devices at the valley-side and the mountain-side can be correspondingly differently dimensioned; in the illustrated exemplary embodiment the valley-side force measuring devices 39a are dimensioned for measuring more pronounced forces and the mountain-side force measuring devices 39b are dimensioned for measuring comparatively smaller forces. For the brakes force measurement there can be used different measuring devices, for example, cells of electrical or hydraulic type, strain gauges or measuring springs. The constructive manifestation of the brake carriage and the coupling with the guide housing is naturally essentially determined by the type of measuring devices employed and does not have associated therewith any difficulties. By means of the output signals of the force measuring devices, i.e. the electrical measuring voltages, measuring pressures or measuring displacements, for instance of the transmission rod 31 relative to the brake carriage 28 there is controlled a control mechanism 40 which, in turn, controls the oil pressure in the brake cylinder 27 of the brake.

In FIG. 5 there is schematically illustrated a preferred embodiment of a braking mechanism. The lower portion of the drawing shows a force balance 14 with control mechanism at which there is connected the hydraulic installation of the braking device. In the force balance 14, which is essentially constructed like the force balance illustrated in FIG. 4, there are provided as the force measuring devices the measuring springs 41a, 41b, which springs are robust and reliable force measuring devices, which without any complicated protective measures are capable of withstanding the rough operating conditions prevailing at aerial cableways concerning climatic and weather influences, something which is important for operational reliability. Additionally, by appropriately constructing a measuring spring or a combination of measuring springs the strong braking forces occurring at heavy aerial cable vehicles also can exactly be detected for a relatively short spring path of only a few centimeters length. The control mechanism 40 consists, in the illustrated exemplary embodiment, of a control cylinder 42, which is attached at the brake slide 28, wherein the brake slide 28 is constructed in the form of a hollow cylinder which is sealed at the transmission rod 31 and axially displaceable in the cylindrical guide housing 29. The end of the transmission rod 31 which protrudes out of the brake slide 28 carries the piston 43 of the control cylinder. The piston 43 possesses a circumferential groove or rill 43c, by means of which the piston 43 is subdivided into a valley-side piston portion 43a and a mountain-side piston portion 43b. Each piston portion 43a, 43b possesses at its outer surface an axial groove 44a and 44b respectively, which emanates from the relevant piston end surface and leads up to almost the region of the circumferential furrow or rill 43c, but however does not open thereinto. In the "null" position of the piston 43, which will be considered more fully hereinafter, there is provided in the control cylinder 42 at both sides of the piston 43 a respective pressure compartment 45 and 46 respectively, and at the region of the circumferential furrow or rill 43c an annular compartment 47. At the control mechanism 40 there is connected a hydraulic control device by means of which the control mechanism 40 is coupled with the brake cylinder or cylinders 27. In FIG. 5 the hydraulic control mechanism has only been shown to the extent necessary for explaining the mode of operation of the control mechanism 40. At the annular compartment 47 there are connected two oil conduits 48, 49 (compare also FIG. 6), of which the one conduit 48 leads via a junction or node point 50, a release mechanism 51 and a second node or junction point 52 to the brake cylinder 27 of the catch brakes 13 (in the drawing there has been exemplary illustrated only one for all catch brakes of the brake device) and the other oil conduit 49 leads directly to an oil container or reservoir 61. The mountain-side pressure compartment 46 in the control cylinder 42 is connected by a conduit 53 with a control element indicated in the form of a check valve 54 in FIG. 5 with the node or junction point 50 of the oil conduit or line 48. In the same manner the valley-side pressure compartment 45 is connected via a conduit 56, which likewise contains a control element which has been shown in FIG. 5 as a check valve 55, with the aforementioned node or junction point 50. At the oil conduit or line 48a leading away from the second node point 52 and to the brake cylinder 27 there is connected for instance a pressure accumulator 57. By means of a pump 60, the outlet of which is connected by the conduit 58 containing the check valve 59 with the conduit junction point 52, it is possible for oil to be pumped out of the container 61 into the conduit arrangement 48, 48a. The brake applying device 51, for instance a combination of valves, is advantageously constructed such that it is triggered when the cable becomes slack and/or manually and/or upon exceeding a certain speed.

As already mentioned, the brake cylinders 27 of the catch brakes 13 with open brake are continually under pressure in order to hold the brakes released.

The apply of the brakes occurs by actuating the release mechanism; this may be done manually during an intentional braking action or automatically via a slack cable release when the tension in the traction cable gives (rupture of the cable) and upon exceeding a certain speed. With the release mechanism 51 actuated the brake cylinders 27 are connected via the conduits 48a, 48, the annular compartment 47 in the control cylinder 42 and the conduit 49 with the oil container 61, so that the pressure in the brake cylinders 27 decreases and the brake jaws 19 (FIG. 3) are pressed by the brake spring 26 against the carrier or support cable 2. During contact of the brake jaws during the descending travel the brake carriage remains back or trails with respect to the running carriage, so that the guide housing 29 is drawn off of the brake slide 28 and thus the piston 43 is moved towards the left in the control cylinder 42, wherein the running carriage (guide housing) and brake carriage (brake slide) are coupled with one another by the strong valley-side measuring spring 41a and the effective braking forces are detected by such. During traveling uphill the brake carriage is pushed uphill by the running carriage and the coupling of the running carriage and brake carriage occurs by means of the mountain-side measuring spring 41b, which in the case of the released brake must support the descending force of the brake carriage and the acceleration and friction forces which occur thereat. If the mountain travel is braked, then the guide housing 29 is displaced onto the brake slide 28 and the piston 43 moves towards the right in the control cylinder, wherein the braking force is detected by the mountain-side measuring spring 41b. In the equipment shown in FIG. 5 there is present in the double-acting control cylinder 42 at each side of the piston 43 a pressure compartment 45, 46. If during the valley travel no pressure exists in the mountain-side pressure compartment 46, then the valley-side braking force equals the force of the valley side measuring spring 41a plus the control piston force with regard to the valley-side pressure compartment 45. During traveling-uphill with the brake carriage being pushed the corresponding conditions are present, i.e. no pressure exists in the valley-side pressure compartment 45, thus the mountain-side braking force is equal to the force of the mountain-side measuring spring 41b less the push force for the brake carriage (descending force, acceleration, friction) plus the control piston force in relation to the mountain-side pressure compartment 46.

The guide housing 29 with the transmission rod 31, the brake slide 28 with the control cylinder 42 and the piston 43 as well as its circumferential furrow or groove 43c are constructed such and the measuring springs 41a, 41b dimensioned such that with the released brakes in all of the normal operating conditions during traveling uphill and traveling downhill starting position is assumed by the piston 43 in which the mouth openings of both oil conduits 48 and 49 are connected with one another in the control cylinder 42 by the furrow or groove 43c. Now if the brake releasing device 51 is actuated, then the brake cylinder 27 is connected via the line or conduit 48a, 48, the circumferential furrow or rill 43c and the conduit 49 with the oil container 61. The pressure in the brake cylinder 27 disappears and the brake spring 26 brings the brake jaws to bear against the carrier or support cable. The pressure in the pressure compartments 45, 46 is likewise null owing to their connection via the oil conduits 53, 56 and the check valves 54, 55 with the oil conduit 48. Due to the contact of the brake jaws at the carrier cable the piston 43 is displaced towards the left or the right out of its starting position depending upon the direction of travel. The rated value of the braking force corresponds to a certain force of the downhill travel- or the mountain travel-measuring springs 41a, 41b and thus a certain spring displacement. This certain spring displacement corresponds to the width of the circumferential furrow 43c in the control piston 43. If accordingly upon application of the brake jaws the braking force assumes the rated value, then the control piston 43 is displaced, the oil conduits 48 and 49 however remain coupled with one another via the circumferential groove 43c. During this piston stroke, the idle running there does not occur any control of the brake force and with regard to the brake force-control the terminal positions of the control pistons are the null positions. If the brake force is or becomes larger owing to a larger coefficient of friction, then the control piston 43 is displaced through the null positions towards the left or the right. Upon exceeding the null position, for instance during downhill or valley travel, the piston portion 43b closes the mouth opening of the oil conduit or line 48, whereas the mouth opening of the oil conduit 49 comes to lie in its groove 44b, so that the mountain-side pressure compartment 46 in the control cylinder is connected by the groove 44b and the oil conduit 49 with the oil container or reservoir 61 and by means of the oil which then flows out of the oil container 61 into the pressure compartment 46 there is prevented a negative pressure (FIG. 6). With the oil conduit 48 sealed off the valley-side pressure compartment 45 is separated from the oil conduit 49 leading to the oil container 61 and the control piston force generated by the displacement of the control piston 43 acts via the oil conduit or line 56, the check valve 55, the oil conduits 48 and 48a at the brake cylinder 27, so that the braking force of the brake jaws at the carrier cable is correspondingly reduced. In this way the braking force also decreases and with decreasing braking force the displacement towards the left of the control piston 43 becomes smaller and reverses into a right-directional displacement, until there has been adjusted a force equilibrium condition, i.e. the braking force has assumed the rated value, in which the control piston 43 is in its one null position. During braking upon traveling uphill the analogous condition is present. Due to the control piston 43 which is displaced towards the right the oil conduit 48 is closed and by means of the groove 44a in the valley-side piston portion 43a the valley-side pressure compartment 45 is connected to the oil conduit or line 49 leading to the oil container 61, whereas the mountain-side pressure compartment 46 is in connection via the conduit 53 and the check valve 54 with the sealed oil conduit 48.

For heavy aerial cableway vehicles there are provided for each carrier or support cable more than one brake. The apply of the brake occurs, as mentioned, by the applying device 51 when the cable is slack, upon exceeding the requisite speed and by manual actuation. It is not necessary in each instance that all catch brakes are simultaneously applied. Thus, it is satisfactory for instance during driving of the cableway into the mountain station, that only upon rupture of the mountain-side tension cable all brakes are applied and upon rupture of the valley-side tension cable or upon manual releasing only a part of the catch brakes are applied. The catch brakes in such case are assembled into groups and their brake cylinders are then connected by a corresponding applying device with the oil conduit 48.

Based upon the preceding described functions different exemplary embodiments are possible. Thus, instead of a control cylinder there can be used as the control mechanism without difficulty also a valve unit, which for instance contains conventional jet pipe regulators. In the precedingly described brake mechanism the direct adjustment of the control piston by the measuring springs is of particular advantage. Such direct adjustment also can be realized in the case of valve units. If there are used as the force measuring devices, instead of the measuring springs, other transmitters, especially electrical transmitters, such as strain gauges, then generally a direct adjustment of the control mechanism is not possible and there must be used transmission elements which additionally constitute sources of disturbance. A further advantage of the measuring springs and the hydraulic control mechanism is that the brake mechanism faultlessly functions without additional protective measures throughout a temperature range of −35°C to +65°C, in other words in a temperature range which hardly is exceeded in the case of mountain cableways.

Figure 7:
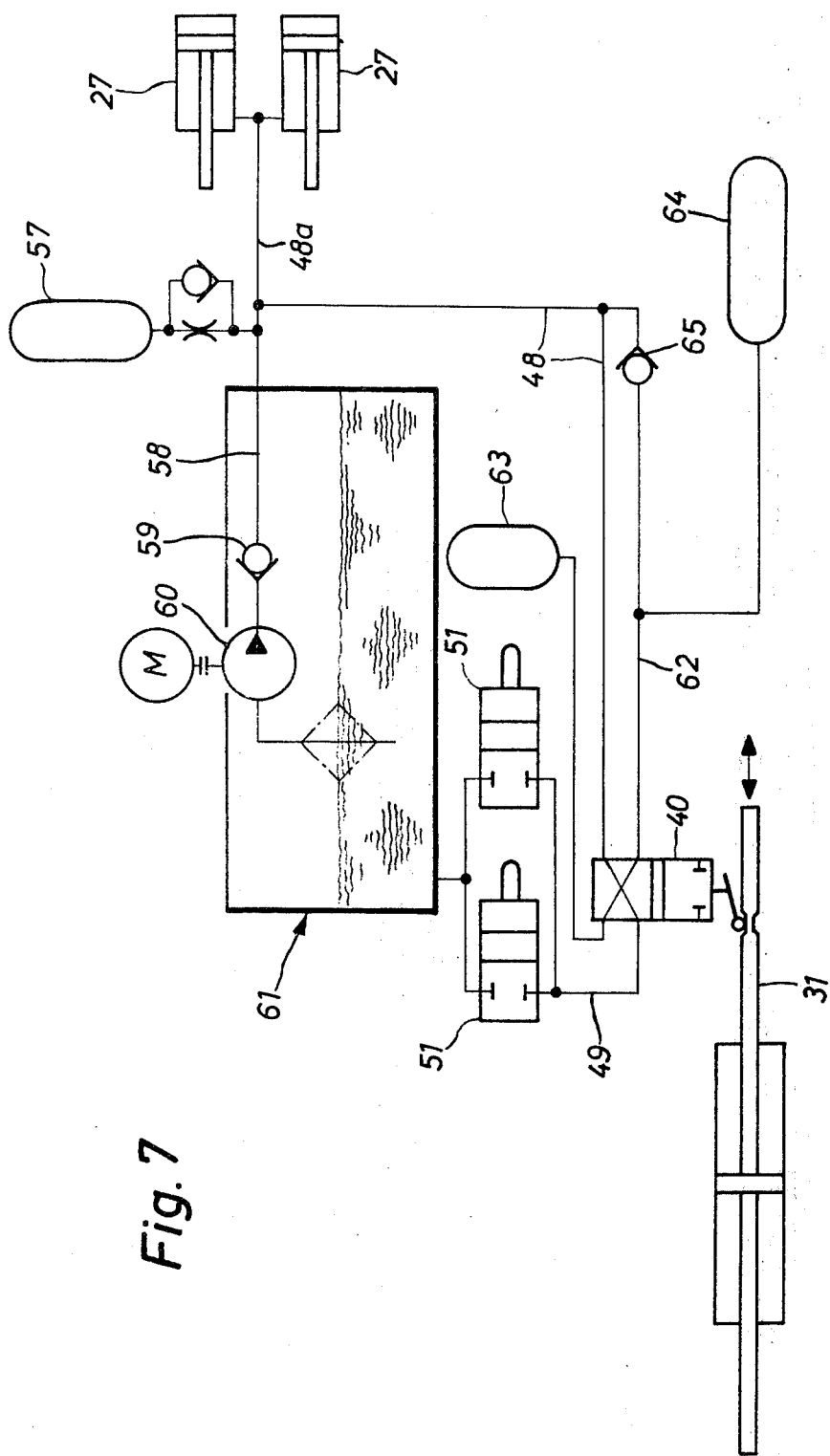
FIG. 7 is a modified embodiment of the control hydraulic mechanism with a brake force-control valve.

For the event that the brake force fluctuates with extremely high frequency and consequently there are available extremely short control time intervals, namely up to for instance 0.005 seconds, the control mechanism according to a modified exemplary embodiment of FIG. 7 possesses a braking force-control valve 40 which is actuatable by the transmission rod 31, which in the idling range on the one hand connects the braking fluid line 48 leading from the braking fluid container 61 while interposing the pump 60 to the brake cylinders 27 with the return flow line 49 leading back to the braking fluid container 61, on the other hand connects a storage line or conduit 62 branching off of the braking fluid line 48 with an injection or injector storage 63, and which in the control range — after the reversal brought about by the transmission rod 31 — on the one hand separates the braking fluid line 48 from the return line 49 and connects such with the injection storage 63, on the other hand, separates the storage line 62 from the injection storage 63. The brake release mechanism 51 in this case is mounted in the return flow line 49. At the storage line 62 there is connected a filling storage 64. The filling storage connection is provided between the braking force-control valve 40 and a check valve 65 in the storage line 62.

As long as the braking force-control valve 40 is located in the null position, i.e. the control mechanism with opened brake applying device 51 operates in the idling range, the braking fluid can flow back into the braking fluid container 61. The injection storage 63 and the filling storage 64 are connected with one another, however separated from the control system. If the braking force is too large, there occurs a control operation by reversing the braking force-control valve 40 by means of the transmission rod 31. The braking fluid can no longer flow back into the braking fluid container 61. The injection storage 63 and the filling storage 64 are separated. The injection storage 63 is connected via the braking fluid line 48 with the brake cylinders 27, which release the catch brakes by a preselected amount. This alternate operation or play, as already mentioned, can repeat itself in control time intervals up to 0.005 seconds.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. A brake apparatus with variable braking force for a cable car comprising, in combination: a brake carriage connectable with said cable car by means of a connection shaft and including at least one pressure released catch brake, said catch brake having brake jaws, spring brake pressure means for applying said jaws with a predetermined brake pressure to a guide track of the cable car, hydraulic brake release means including hydraulic brake cylinder means for releasing said brake jaws in counter action to the brake pressure; first brake release pressure generating means connected with said hydraulic brake release means; an actuable hydraulic brake applying device connected with said hydraulic brake release means, whereby said brake is released when said hydraulic applying device is not actuated and is applied when said hydraulic applying device is actuated; at least one brake force measuring device coupling said brake carriage with said connection shaft for ascending travel of the cable car and at least one other brake force measuring device coupling said brake carriage with said connection shaft for descending travel; and a hydraulic control system controlled by said brake force measuring devices via a brake force balance, said hydraulic control system including a hydraulic control mechanism having a second brake release pressure generating means controlled by said brake force measuring devices and operatively connected with said hydraulic brake release means, and wherein said hydraulic brake cylinder means being operatively connected with said first pressure generating means for generating a complete brake releasing pressure within said brake cylinder means when said hydraulic brake applying device is not actuated and said brake cylinder means being operatively connected with said hydraulic second brake release pressure generating means via said hydraulic control system for generating a controlled brake pressure within said brake cylinder means upon actuation of said hydraulic brake applying device.

2. The brake apparatus as defined in claim 1, wherein the hydraulic control mechanism controlled by the brake force measuring devices via the brake force balance possesses an idling range corresponding to a brake force measuring range of said force measuring devices up to a certain rated brake force, and a respective control range for braking during descending travel and braking during ascending travel, wherein in said idling range for a complete releasing drop, and in said control ranges for a control of the brake releasing pressure said brake cylinder means is actuated by said hydraulic control mechanism including the hydraulic second brake release pressure generating means.

3. The brake apparatus as defined in claim 2, wherein the hydraulic control system includes a brake fluid line having a forwardly arranged pump and being connected with the brake cylinder means and with the hydraulic control mechanism, and a return flow line leading from said hydraulic control mechanism to a brake fluid container, and wherein said hydraulic control mechanism includes first control means including part of said second brake release pressure generating means, for connecting said brake fluid line in the idling range of said hydraulic control mechanism with said return flow line leading to said brake fluid container, and second control means including part of said second brake release pressure generating means, for disconnecting said brake fluid line from said return flow line and operatively connecting said brake fluid line with the second brake release pressure generating means.

4. The brake apparatus as defined in claim 3, wherein said two force measuring devices being arranged between four bearing surfaces in a substantially cylindrical housing hingedly connected to said connection shaft, a brake slide means having the form of a substantially cylindrical hollow body guided in said housing and being displaceable in the direction of travel relative to said housing but rigidly connected with the carriage, and wherein said substantially cylindrical housing includes a transmission rod coaxially hingedly connected to a floor of said housing; said transmission rod having a cylindrical contact portion forming two of said four bearing surfaces and said hollow body accomodating said transmission rod and forming at its inside both of the other two of said four bearing surfaces, so that by means of said four bearing surfaces the braking forces are transmitted to said brake force measuring devices arranged between said surfaces.

5. The brake apparatus as defined in claim 4, wherein the brake force measuring devices comprises measuring springs, and said hydraulic control mechanism for connecting the brake cylinder means with the return flow line and said hydraulic second brake release pressure generating means is directly controlled by the displacement of the transmission rod relative to the brake slide means occurring when the braking force is effective.

6. The brake apparatus as defined in claim 5, wherein said hydraulic control mechanism for connecting the brake cylinder means with the return flow line and said hydraulic second brake release pressure generating means comprises a control cylinder having a piston forming part of said first and second control means, said first control means comprising a rill on said piston and dividing said piston into a valley-side piston portion and a mountain-side piston portion, said piston being rigidly connected with the transmission rod of the brake force balance, and wherein the hydraulic second brake release pressure means comprises a first pressure compartment in the control cylinder at the side of the valley-side piston portion and a second pressure compartment, in the control cylinder at the mountain-side piston portion.

7. The brake apparatus as defined in claim 6, wherein both piston portions contain a respective axial groove leading up to almost the region of the rill, the groove on said mountain-side piston portion connecting said second pressure compartment which is ineffectual for the control of the braking force during the descending travel and the groove on said valley-side piston portion connecting said first pressure compartment which is ineffectual for the control of the braking force during the ascending travel respectively with the return flow line, so that during piston displacement no excess pressure prevails in the respective ineffectual pressure compartment.

8. A brake apparatus with variable braking force for cable cars comprising, in combination, a brake carriage connectable with a cable car by means of a connection shaft and including at least one pressure released catch brake, said catch brake having brake jaws, brake spring means for applying said jaws with a predetermined brake pressure to a guide track of the cable car, and a hydraulic brake cylinder means for releasing said brake jaws in counteraction to the brake pressure, said brake cylinder means being connected with pressure accumulator means for generating a brake release pressure in said brake cylinder means; an actuable brake applying device connected with said brake cylinder means, whereby said brake is released when said applying device is not actuated and is applied when said applying device is actuated; at least one brake force measuring device coupling said brake carriage with said connection shaft for ascending travel of the cable car and at least one other brake force measuring device coupling said brake carriage with said connection shaft for descending travel; a hydraulic control mechanism including a control valve and valve operating means controlled by said force measuring devices via a brake force balance, said valve operating means possessing an idling range corresponding to a force measuring range of the force measuring devices up to a certain rated brake force, and a respective control range for braking during descending travel and braking during ascending travel, said control valve being switched by said operating means from said idling range in a first connecting position to said control ranges in a second connecting position; a brake fluid line having a forwardly arranged pump and being connected with the brake cylinder means and with said control valve; a return flow line leading from said control valve to a brake fluid container; a storage line branching off from said brake fluid line; and an injection storage for generating a controlled brake releasing pressure within said brake cylinder means, said injection storage being connected with said control valve; said control valve connecting in said first position said brake fluid line with said return flow line and said storage line with said injection storage and in said second position disconnecting said brake fluid line from said return flow line, connecting said return flow line with the injection storage and disconnecting said storage line from said injection storage.

9. The brake apparatus as defined in claim 8, wherein the brake applying device is arranged in the return flow line so as to be connectable by the control valve with the brake fluid line in the first connecting position and with the storage line in the second connecting position.

10. The brake apparatus as defined in claim 9, further including a filling storage connected with the storage line leading to the control valve.

11. The brake apparatus as defined in claim 10, wherein the filling storage has a filling storage connection provided between the brake force-control valve and a check valve in the storage line.

\* \* \* \* \*